March 6, 1951     D. G. ROOS     2,544,546
JOINT CONSTRUCTION
Original Filed March 24, 1944     3 Sheets—Sheet 1
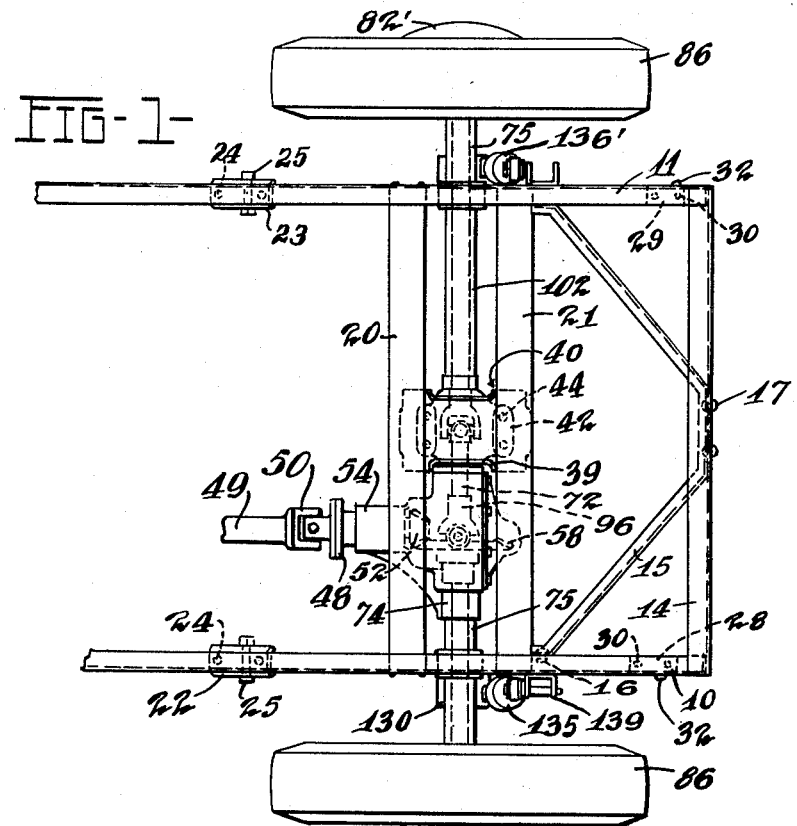
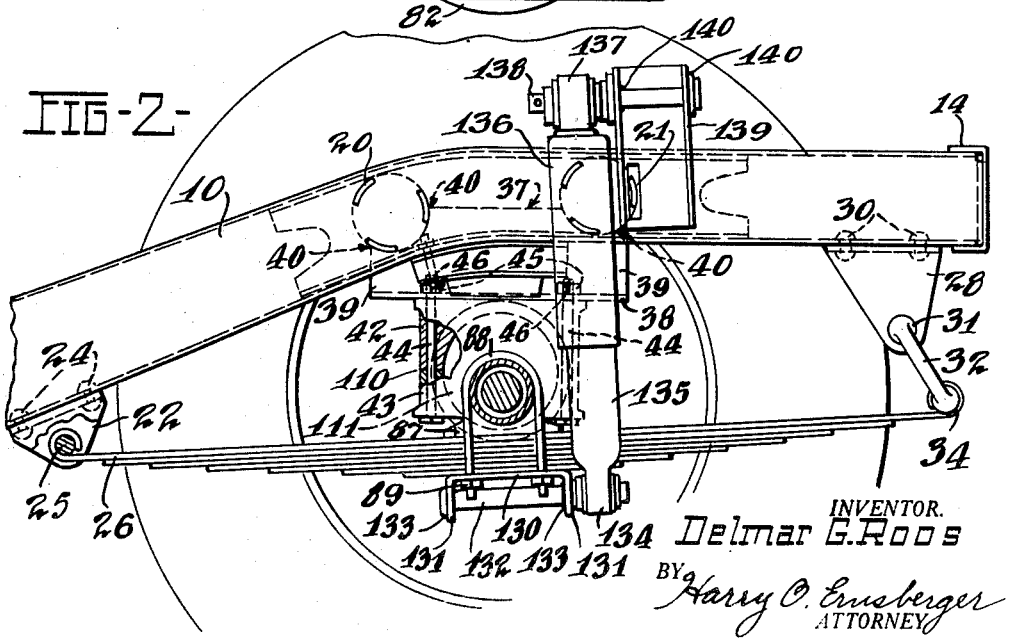
INVENTOR.
Delmar G. Roos
BY Harry O. Ernsberger
ATTORNEY

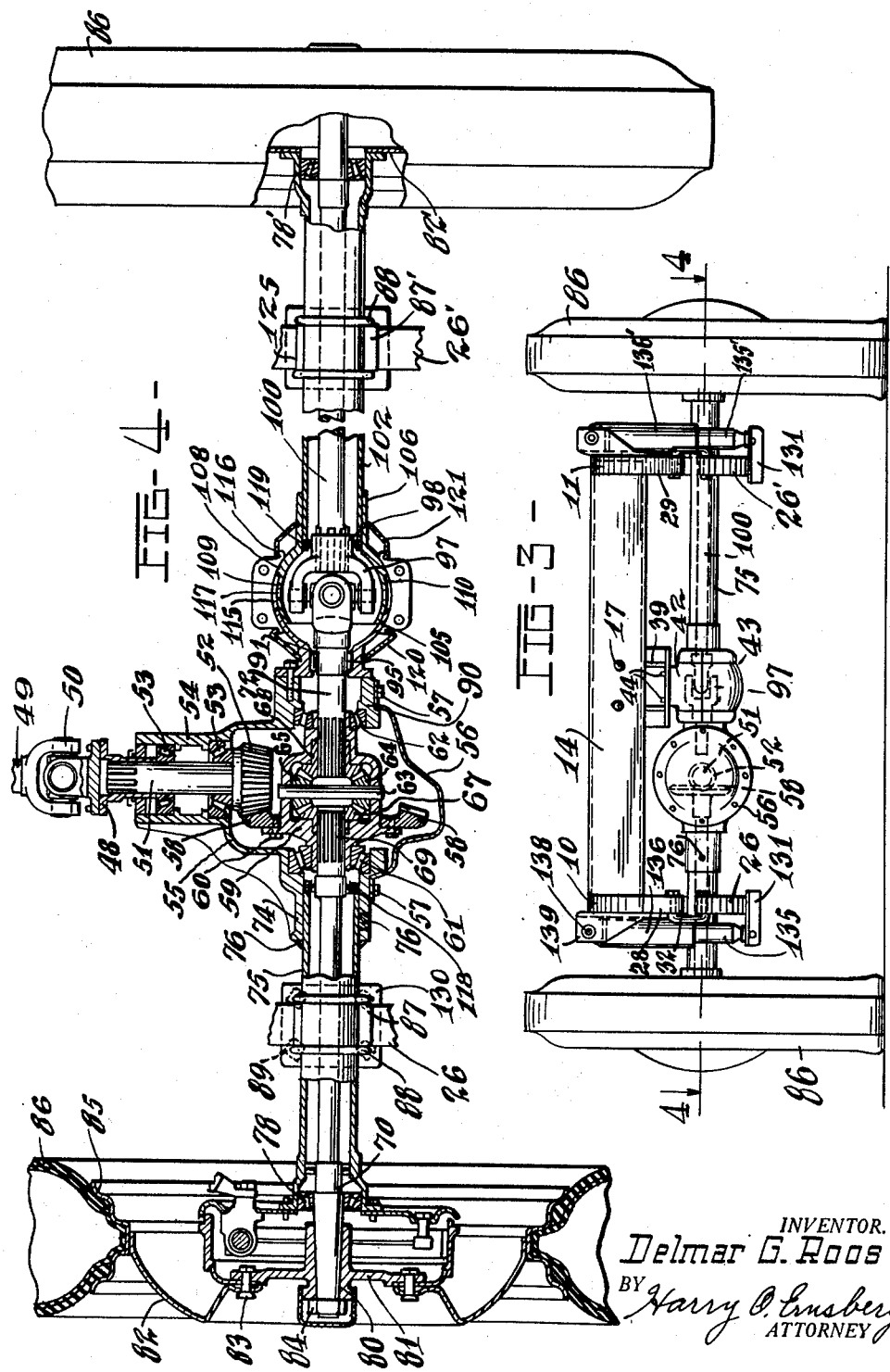

March 6, 1951 D. G. ROOS 2,544,546
JOINT CONSTRUCTION
Original Filed March 24, 1944 3 Sheets-Sheet 3
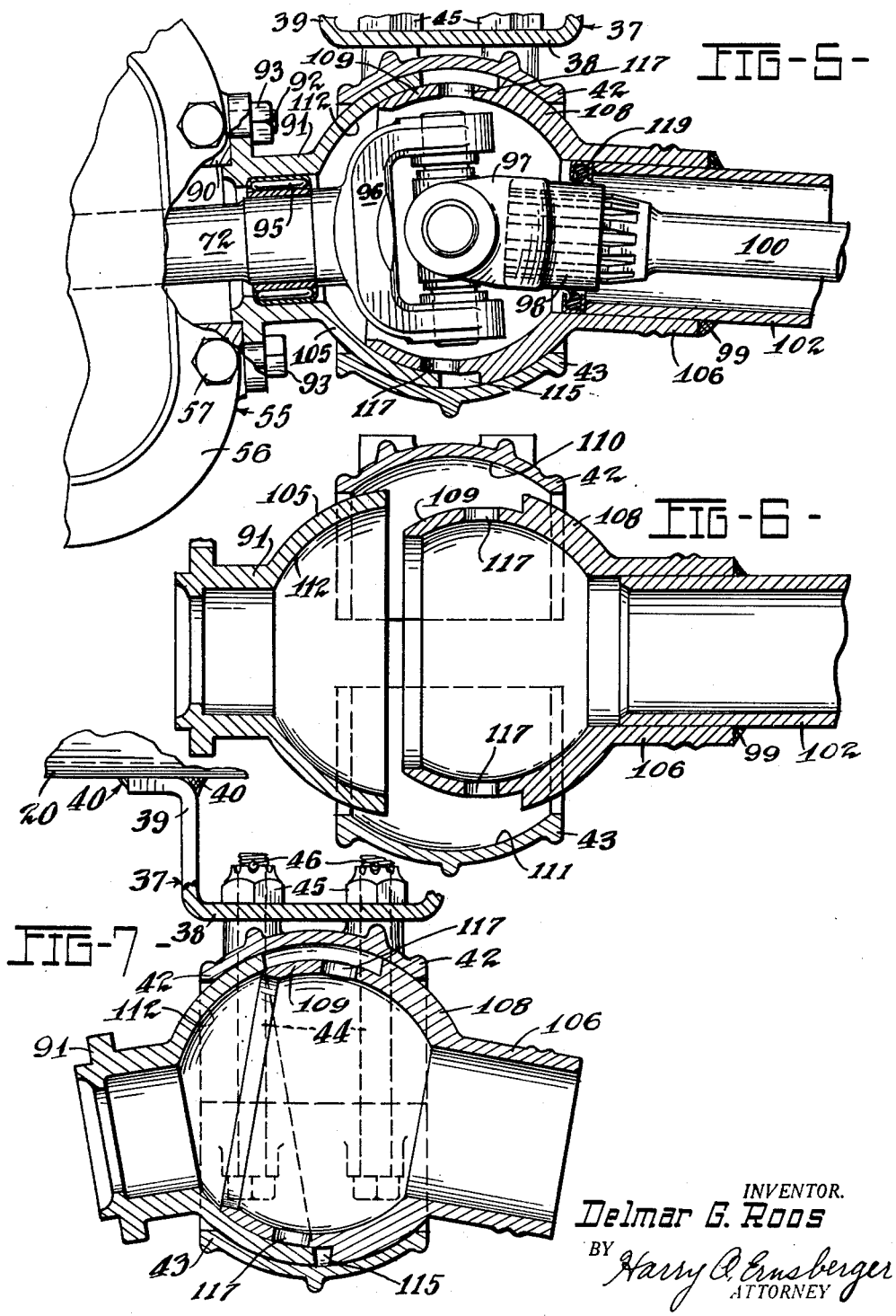
INVENTOR.
Delmar G. Roos
BY Harry A. Ernsberger
ATTORNEY Patented Mar. 6, 1951

2,544,546

UNITED STATES PATENT OFFICE 2,544,546

JOINT CONSTRUCTION

Delmar G. Roos, Toledo, Ohio, assignor to Willys-Overland Motors, Inc., Toledo, Ohio, a corporation of Delaware Original application March 24, 1944, Serial No. 527,982, now Patent No. 2,417,325, dated March 11, 1947. Divided and this application January 29, 1945, Serial No. 575,114

4 Claims. (Cl. 64—32)

This invention relates to axles of automotive vehicles and more particularly to an arrangement wherein the driving wheels are independently sprung on the frame, and is a division of my copending application, Serial Number 527,982, filed March 24, 1944, now Patent No. 2,417,325, patented March 11, 1947.

The invention embraces the provision of a vehicle wheel driving means associated with half axles so arranged that each of the driving wheels is arranged for vertical movement independently of the other.

The invention is inclusive of an arrangement wherein the housings for the wheel driving shafts are articulately connected together substantially at the longitudinal center line of the vehicle so as to obtain a maximum radius of oscillation for the drive wheels so as to minimize the amount of wheel tread variation.

An object of the invention resides in an arrangement of driving means for an automotive vehicle in which the unsprung weight is greatly reduced over the conventional type of solid axle.

The invention is inclusive of an arrangement of driving means for vehicle wherein the axles are articulated about a common center and wherein the differential mechanism and drive gearing are associated with one of the wheel driving shafts in such a manner that vertical movements of the driving gear and differential mechanism are minimized and wherein a large proportion of the weight of said mechanisms is sprung weight.

Another object of the invention resides in an arrangement of this character wherein the driving torque reaction is transmitted to the vehicle frame through one of the springs connected to one of the axle constructions.

Another object of the invention resides in the provision of an independently sprung axle construction in which components of the wheel driving means are articulated through the use of a single universal joint.

Still another object is the provision of novel means for articulately connecting the axle housing together for oscillation about a common center in a manner wherein the components of the oscillating joint structure are reduced to a minimum.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view showing one form of my invention;

Figure 2 is a side elevational view showing the axle and springing arrangement with a vehicle wheel removed;

Figure 3 is a rear elevational view of the arrangement shown in Figure 1;

Figure 4 is a horizontal sectional view taken substantially on the line 4—4 of Figure 3;

Figure 5 is an enlarged detail sectional view showing the ball-like configuration connecting the axles together;

Figure 6 is a view showing the configuration of the components making up the ball joint;

Figure 7 is a view illustrating the relation of the components of the joint in extreme angular positions.

While I have illustrated the arrangement of my invention as adapted for a rear wheel drive of a vehicle, it is to be understood that my invention may be utilized as a front wheel drive for a four wheel drive vehicle without departing from the spirit of the invention.

Referring to the drawings in detail, the frame of the vehicle with which I have illustrated my invention is inclusive of side rails or frame members 10 and 11 joined together at their rear extremities by means of a transverse member 14 and reinforced by means of a diagonally arranged strut 15 which is secured to the side rails 10 and 11 by means of rivets 16 and to the transverse bar 14 by rivets 17. The side rails 10 and 11 are also joined together by means of hollow tubes or members 20 and 21 having their extremities welded or otherwise secured to the side rails.

Arranged beneath the frame members 10 and 11 are brackets 22 and 23 which are secured to the frame by rivets 24, each bracket having openings therein to receive a bolt 25 which forms a connection for an eye formed at the forward extremity of the upper leaf of each of the leaf spring assemblies 26 and 26' arranged at either side of the vehicle and beneath the frame members 10 and 11. Brackets 28 and 29 are secured by rivets 30 to the rear portions of the frame members 10 and 11 as particularly shown in Figure 2, the depending side walls of brackets 28 and 29 having aligned openings to receive shackle bolt portions 31 of spring shackles 32, the lower extremities of the spring shackles 32, being formed with bolt portions 34 passing through the eyes formed at the rear extremity of the upper spring leaf of each spring assembly.

Positioned substantially centrally of the frame construction is a bracket or support 37 having a uniplanar horizontally arranged portion 38 and upwardly extending projections 39 welded or otherwise secured to the tubes 20 and 21 as at 40. In the embodiment illustrated, the uniplanar portion 38 of member 37 is arranged to carry or support members 42 and 43. The members or supports 42 and 43, and the uniplanar portion 38 of bracket 37 are formed with aligned openings to receive bolts 44, the upper ends of the bolts receiving castellated nuts 45 to secure members 42 and 43 in fixed position with respect to and supported upon the frame construction. Cotter keys 46 are utilized to prevent removal of the nuts 45. The interior walls of members 42 and 43 when assembled together provide a partial spherical configuration, which forms part of an articulated connection between the axle housing constructions, this arrangement being hereinafter more fully described.

In the arrangement of my invention as illustrated, the engine or prime mover (not shown) is arranged forwardly of the rear driving wheels. The power of the engine is conveyed through a transmission construction (not shown) to a propeller shaft 49, the latter being joined by means of a universal joint or coupling 50 to a flanged fitting 48 carried upon a comparatively short driving or pinion shaft 51, the latter having a pinion 52 formed on the end thereof. The pinion shaft 51 is suitably mounted for rotation in anti-friction bearings 53 disposed in a hollow projection 54 formed on a differential and driving gear housing 55. The driving pinion 52 is enmeshed with a driven or ring gear 58, the latter being secured to a differential casing or spider 59 by means of stud bolts 60, the differential casing 59 is journalled in bearings 61 and 62 mounted in recesses in the housing 55. The differential mechanism is inclusive of a stud shaft 63 upon which is revolubly mounted bevel pinions 64 and 65 which are in mesh with bevel gears 67 and 68. Gear 67 is feather-keyed upon the splined extremity 69 of an axle shaft or live axle 70, while gear 68 is similarly feather-keyed upon the extremity of a shaft 72, in alignment with the axle shaft 70. The opening in the rear of the housing 55 is closed by means of a cover 56 retained in place by means of cap screws 57.

Housing 55 enclosing the driving gear and differential mechanism is formed with a hollow lateral extension 74 which receives the inner end of an axle or axle housing 75, the parts being welded together as shown at 76. The outer extremity of the axle 75 is enlarged to accommodate an anti-friction bearing means 78 upon which is journalled a shaft or live axle 70. The axle shaft 70 is formed with tapered portion 80 adapted to receive a hub 81, the latter supporting a wheel 82 secured thereto by means of bolts 83. The hub 81 is retained on the tapered portion of the axle shaft by means of a securing nut 84. The wheel 82 is provided with a rim 85 carrying a pneumatic tire 86. Welded to the axle 75 is a spring pad 87 which forms a seat for the leaf spring assembly 26, the later being secured to the spring seat by means of U-shaped bolts 88. The legs of the U-shaped bolts 88 extend through openings in a plate 130, nuts 89 being threaded onto the U-shaped bolts serving to hold the plate 130 and the spring assembly rigidly to the axle 75. Plate 130 is formed with depending flanges 131 having aligned openings to receive a pintle 132 which is welded to the flanges as at 133. Pivoted upon the pintle 132 is a member 134 formed upon the lower end of an element 135 forming part of a hydraulic shock absorber of conventional design. Another element 136 of the shock absorber construction, which is telescopically arranged with respect to element 135, has a projection 137 pivoted upon a pin or pintle 138. The pin 138 extends through openings in a channel shaped bracket 139 welded to the side of the frame rail 10, the pin 138 being welded in fixed position to member 139 as at 140.

The housing 55 is formed with a projecting portion 90 to which is secured a member 91 by means of threaded studs 92 and nuts 93. The member 91 is recessed to accommodate a needle bearing 95 or other suitable antifriction bearing means for revolubly supporting the short shaft 72. Shaft 72 is formed at one extremity with a configuration 96 forming one element of the universal joint construction. Another element 97 of the universal joint arrangement is provided with a hub portion 98, which is splined upon the extremity of an axle shaft 100 to the outer end of which is secured a vehicle wheel 101. Axle shaft 100 is surrounded by an axle or housing 102 which is enlarged at its outer end to accommodate an antifriction bearing 78' of the same construction as bearing 78. Thus, rotation of shaft 72 is communicated to axle shaft 100 through the medium of the universal joint construction 96—97. As the universal joint construction illustrated is of conventional design it is believed unnecessary to describe it in further detail.

Axle shaft 100 carries at its extremity a road wheel with rim and tire assembly as is carried by road wheel 82. A spring pad 87' is welded to the axle or axle housing 102 to which is secured a leaf spring assembly 26' of identical construction with leaf spring assembly 26. This arrangement is also provided with a hydraulic shock absorber construction 135'—136' which is connected between the leaf spring assembly 26' and the frame rail 11 in the same manner that shock absorber 135—136 is connected to leaf spring assembly 26 and frame side rail 10.

In the arrangement of my invention as illustrated, the center of the universal joint is substantially in the longitudinal center plane of the vehicle. The axle constructions are arranged for limited oscillatory movement about the center of the universal joint construction 96—97. To this end the member 91 is formed with a partial spherical shaped portion 105. Welded to the inner end of the housing 102 as at 99 is a member 106 which is formed exteriorly into two partial spherically shaped portions 108 and 109 of different radii. The exterior spherically shaped surfaces of portions 105 and 108 are of substantially the same radii and members 42 and 43 forming a support are formed with interior spherically shaped surfaces 110 and 111 of a dimension to slidably or oscillatably receive the exterior surfaces 105 and 108 and form a spherical seat therefor. The radius of the interior wall 112 of portion 105 and the radius of the exterior surface of portion 109 are such as to coincide or slidably fit together.

It is to be noted that the angles through which the axle constructions oscillate in a vertical direction are limited by the amount of relative oscillatory movement of portion 109 with respect to the portion 105 is correspondingly limited. One of the features of the present invention resides in the novel arrangement of fabricating the ball joint of this character with a minimum number of parts or elements. In order to assemble portions 105 and 108 in the present construction, the parts are brought into preliminary contact as illustrated in Figure 7 and both portions of the ball configuration inserted in the half spherical recess formed in the support 42. With the parts in this position, member 43 is then moved to proper position and is secured to member 42 by means of the studs 44. The member 43 is provided with a partial spherical surface also engaging the spherical surfaces 105 and 108 to secure members 91 and 106 in definite articulate relationship. It should be noted that due to the particular construction of the ball shaped configurations, an annular space 115 is provided which accommodates independent oscillatory movements of each of the axles or axle housings 75 and 102, the center of oscillation being about the center of the coupling formed by the universal joint 96—97.

The differential mechanism, driving pinion, ring gear and universal joint mechanism 96—97 are lubricated by lubricant contained within the housing 55, the lubricant being permitted to pass through the interstices between the needles of bearing 95 to reach the interior of the ball joint configuration. Openings 117 are provided in portion 109 in order to admit lubricant to the spherical surfaces of portions 105, 108 and the interior spherically shaped surfaces of supporting members 42 and 43 so as to adequately lubricate all relatively movable elements of the ball joint. Lubricant seals 118 and 119 prevent the escape of lubricant from the housing 55 and the ball joint construction. The exterior portions of supports 42 and 43 are formed with annular grooves to receive dust caps 120 and 121 of flexible material to accommodate relative movements of the axles, the caps serving to prevent the ingress of dirt or other foreign matter into the ball joint construction.

The operation and action of the vehicle driving means and axle arrangement of my invention is as follows: Each of the wheels 86 and 86' being connected, through the axles or axle housings 75 and 102 and other elements hereinbefore described, to the ball configuration arranged within the supports 42 and 43 oscillate about the center of curvature of the interior surface of supports 42 and 43. It should be noted that axle housing 75, drive gear and differential housing 55 and member 91 are all fixedly secured together so that these elements form, in effect, an integral wheel supporting means or axle oscillating about a point disposed centrally of the vehicle, the distance of each wheel from the center of its oscillation being substantially the same.

The arrangement of my invention hereinbefore described permits vertical movement of one driving wheel independently of the other, which is a vital factor enhancing the riding comfort of the vehicle. During vertical movements of one or both of the driving wheels, there is a variation in the point of contact of the tread of the wheels upon the roadway due to the fact that the wheels are fulcrumed or hinged for oscillation about a common center. I have found that this is advantageous in that it tends to distribute the wear on the tires over a wider peripheral area thereof. Furthermore, I have found that in the practical operation of a vehicle embodying the invention, there is little or no scuffing or "scrubbing" of the tires upon the roadway surfaces apparently for the reason that while the point of contact or tread of a driving wheel is changing laterally, the vehicle is in motion, and the tires are in rolling engagement with the roadway. Thus if road irregularities cause vertical movement of the wheels with consequent variation in the tread, the path of contact of the tire on the roadway may be out of parallelism with the direction of movement of the vehicle, but as this changing contact is a rolling action of the tire, very little, if any, lateral scuffing is encountered.

The differential housing 55 and parts contained therein as well as the end portion of the propeller shaft, being fulcrumed about the center of oscillation of the ball joint connecting the axle housings, provides an arrangement whereby a large proportion of the weight of these parts or elements is carried upon the supporting structure 42—43. This construction, therefore, minimizes the unsprung weight carried by the tires and wheels, thus enhancing the "ride" of the vehicle. As the differential housing is fulcrumed quite closely to the center of oscillation of the axles, the vertical movement of the housing and the propeller shaft connected thereto, is very small as compared to the vertical movement of the driving wheels, the ratio of movement being in proportion to the distance of the housing from the fulcrum or center of oscillation of the swinging axles as compared to the distance of the driving wheel 86 from the fulcrum. By minimizing the vertical movement of the propeller shaft 49, the vehicle body may be lowered with a consequent lowering of the center of gravity, thus enhancing the roadability of the vehicle.

As the leaf spring assemblies are securely and rigidly fastened to the spring seats 87 and 87' carried by the axle housings 75 and 102, during each increment of deflection of the leaf spring assemblies in a vertical plane there is attendant a twisting or torsion movement of the main leaf of each spring assembly and to a certain degree a twisting or torsion of the other supporting leaves in each assembly. Thus it will be seen that during vertical movements of the driving wheels, each leaf spring assembly is subjected to a compound action of deflection in a vertical plane and torsion or twist about a longitudinal axis which secures several important advantages, enhancing the ride of the vehicle. In the first instance, the spring rate, i. e. the amount of deflection per increment of weight imposed upon the spring is a variable factor, so that as the load upon the spring is increased, the amount of deflection per unit increment in load proportionately decreases. Thus, in effect, with an increased load upon the vehicle springs, the latter becomes stiffer and its resistance to deflection is increased. The compound spring action of vertical deflection combined with longitudinal torque or twist eliminates any natural period of vibration of the spring. This I have found to be very important as affecting the "ride" of the vehicle because this compound spring action providing a variable rate spring, tends to inherently damp out vibrations, and especially is this true as to rebound or jounce resulting from the reaction of contact of the driving wheels with road irregularities or obstructions. I have found, from a practical application of the invention, that the spring "rebound" resulting from the vehicle wheel encountering a road obstruction is very quickly damped out and very little, if any, vibratory reaction transmitted to the frame and body so that a very smooth "ride" is obtained.

In the form of my invention illustrated, the torque reaction of the arrangement is absorbed by the spring assembly 26 connected to the axle tube 75, as there is no torque resistant connection between axle housing 75 and axle housing 102. This makes for a very flexible drive as the reaction is all taken by only one of the spring assemblies. The brake reactions are absorbed, however, by both leaf spring assemblies 26 and 26'.

It is apparent that, within the scope of the invention, modifications and different arrangements may be made other than is herein disclosed, and the present disclosure is illustrative merely, the invention comprehending all variations thereof.

What I claim is:

1. In combination, a joint construction including a pair of members; said members being respectively formed with internal and external interengaging spherically shaped surfaces; each of said elements being formed with exterior spherically shaped surfaces of equal diameters, means including a pair of supports having spherically curved interior surfaces embracing and in bearing engagement with the exterior spherical surfaces of said members for retaining said members in interengaging relationship, and means for securing said supports together.

2. In combination, a joint construction including a pair of members; said members being respectively formed with internal and external interengaging spherically shaped surfaces; each of said elements being formed with exterior spherically shaped surfaces of equal diameters; means including a pair of semi-annularly shaped supports having curved interior surfaces embracing the exterior spherical surfaces of said members for securing said members in interengaging relationship, and means for securing said supports together to maintain said members in operative relationship.

3. In combination, means for oscillatably joining elements together including a hollow partial spherically-shaped interior and exterior configuration formed at one end of said elements; the second of said elements having a portion configurated with a pair of spherically shaped surfaces of different diameters; the larger of said surfaces being of the same diameter as the exterior spherical surface on said first element; the hollow interior portions of said elements forming a chamber adapted to contain a lubricant; the spherical surfaces of lesser diameter being arranged to slidably fit the interior spherical surfaces of said first element; means engageable with exterior spherically shaped surfaces of each of said elements for retaining the latter in osciliatable relationship, and means including an opening in a wall portion of one of said members for conveying lubricant to said spherically shaped surfaces.

4. In combination, a ball joint including a member having an enlarged partial spherically-shaped end portion, said member having an interior wall of partial spherical configuration; a second member having enlarged portions formed at one end thereof, said portions being of partial spherical configuration of different diameters, the spherical configuration of the lesser diameter arranged to extend into and fit the interior spherical configuration of said first named member; said members being of hollow formation adjacent the spherical configurations forming a chamber adapted to contain a lubricant; means to secure said members together; said means having an interiorly arranged spherical surface adapted to engage the exterior spherically-shaped surface of said first mentioned member and the spherical surface of largest diameter of the second mentioned member whereby said members are adapted for relative limited oscillation about a common center, and means including a plurality of spaced openings arranged in the wall portion of the member at the lesser diameter for conveying lubricant to the spherically-shaped surfaces.

DELMAR G. ROOS.

REFERENCES CITED

The following references are of record in the file of this patent:

UNITED STATES PATENTS

| Number | Name | Date |
|---|---|---|
| 1,474,155 | Krause | Nov. 13, 1923 |
| 1,714,563 | Kiel | May 28, 1929 |
| 1,937,653 | Haltenberger | Dec. 5, 1933 |
| 2,417,325 | Roos | Mar. 11, 1947 |